Feb. 15, 1955　　　　F. R. KRAUSE　　　　2,701,976
APPARATUS FOR POINTING BARS AND THE LIKE
Filed April 17, 1952　　　　　　　　7 Sheets-Sheet 1

INVENTOR
FRANK R. KRAUSE
BY
ATTORNEY

Feb. 15, 1955　　　F. R. KRAUSE　　　2,701,976
APPARATUS FOR POINTING BARS AND THE LIKE
Filed April 17, 1952　　　7 Sheets-Sheet 2

INVENTOR
FRANK R. KRAUSE

BY *Francis J. Klempay*
ATTORNEY

Feb. 15, 1955  F. R. KRAUSE  2,701,976
APPARATUS FOR POINTING BARS AND THE LIKE
Filed April 17, 1952  7 Sheets-Sheet 5

INVENTOR
FRANK R. KRAUSE

BY *Francis J. Klempay*
ATTORNEY

Feb. 15, 1955  F. R. KRAUSE  2,701,976
APPARATUS FOR POINTING BARS AND THE LIKE
Filed April 17, 1952  7 Sheets-Sheet 6

INVENTOR
FRANK R. KRAUSE
BY *Francis J. Klempay*
ATTORNEY

Feb. 15, 1955 F. R. KRAUSE 2,701,976
APPARATUS FOR POINTING BARS AND THE LIKE
Filed April 17, 1952 7 Sheets-Sheet 7

Fig. 12

INVENTOR
FRANK R. KRAUSE

BY *Francis J. Klempay*
ATTORNEY

United States Patent Office
2,701,976
Patented Feb. 15, 1955

2,701,976

APPARATUS FOR POINTING BARS AND THE LIKE

Frank R. Krause, New Castle, Pa., assignor to The McKay Machine Company, Youngstown, Ohio, a corporation of Ohio Application April 17, 1952, Serial No. 282,783

15 Claims. (Cl. 80—40)

This invention relates to apparatus for pointing bars and other elongated metal sections such as is required in the operation of metal drawing plants, for example, where the bars or other shapes to be drawn through a die must have their leading end portions reduced in transverse dimension for ready passage through the die and thus into position for engagement by the grippers of the draw carriage. The principal object of the invention is the provision of an improved method and of improved apparatus for the purpose stated which is capable of a high sustained rate of production with a minimum of maintenance and power requirements in the operation of the apparatus.

A further object of the invention is the provision of improved apparatus for pointing the ends of bars and the like which is entirely automatic in operation but which, nevertheless, may be readily adjusted to tailor the shape of the pointed ends of the bars and the like to the particular die and grip bit installation which will receive the pointed bars for shapes so that scrap loss is kept to a minimum as is also the expenditure of any unnecessary power-consuming cold welding of the end portions of the bars or other shapes.

An ancillary object of the invention is the provision of improved apparatus for pointing the ends of bars and the like in which the bar engaging tools which effect the reduction in transverse dimension of the bars and the like are subject to minimum wear and in which the pattern of movement of the tools in effecting the reduction may be readily controlled so that the longitudinal contour or contours of the worked ends of the bars and the like may be likewise controlled for the purpose of keeping scrap loss low and of avoiding unnecessary work on the bars and shapes as pointed out above.

Other objects and advantages of the invention include the provision of improved arrangements for loading and unloading a bar pointing machine, of aligning the bars with the pointing apparatus, of moving the bars longitudinally into and out of engagement with the pointing tools, and of other features which will become apparent upon consideration of the following detailed specification and the accompanying drawing wherein there is disclosed a preferred embodiment of the invention.

In the drawings:

Figure 7 is a section view taken generally along line VII—VII of Figure 1a;

Figure 1A:
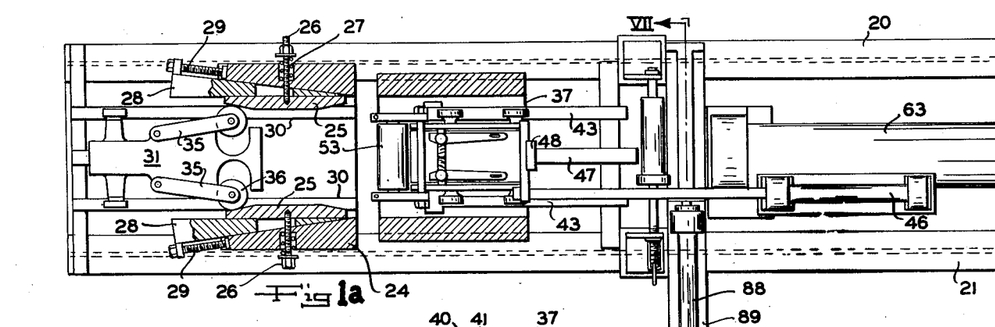
Figures 1a and 1b are complementary and continuing plan views of a bar pointing machine constructed in accordance with the teachings of my present invention and of my prior U. S. Letters Patent Nos. 2,147,301, 2,161,064, and 2,223,039.
Figure 1B:
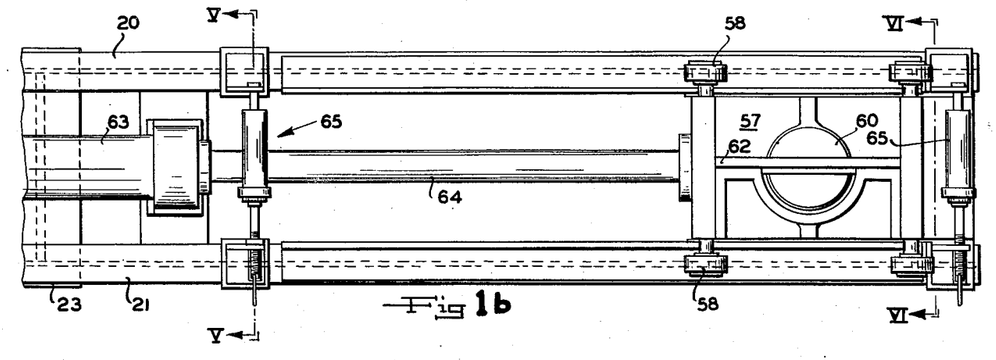

Referring initially to Figures 1a and 1b the numerals 20 and 21 designate spaced parallel I-beam supporting members which are supported above floor level 22 by a plurality of standards 23. Mounted on and secured to the beams 20 and 21, near the left hand end of the apparatus, is a generally rectangular hollow housing 24, and in accordance with usual practice the housing 24 is of a particularly strong and rigid construction. As shown in Figure 1a, the housing 24 carries internally on each vertical side wall a hardened steel cam plate 25 which is horizontally disposed and of diminishing thickness at each end. The cam plates 25 are mounted by means of bolts 26 and coil springs 27 in the manner shown, whereby the cams may be yieldably adjusted inwardly or outwardly of the housing walls.

Accurate inward and outward adjustment of the cam plates 25 is provided by wedge-shaped gibs 28 which are interposed between the side walls of housing 24 and the cams 25 carried thereby. Either the cams 25 or the side walls may be provided with a tapering bearing surface complementing that of the gibs 28, but preferably only the side walls are so provided. Longitudinal adjusting movement of gibs 28 may be effected by means of bolts 29 which are connected to the outer end portion of the gibs 28 and are threadedly engaged with the housing 24 in the manner shown in Figure 1a.

Rigidly mounted in relation to the housing 24, and positioned below and slightly inwardly of the cam plates 25 are spaced rails 30 upon which is carried for to and fro movement into and out of the housing 24 a roll carriage 31. The roll carriage 31 is provided with a plurality of antifriction wheels 32 to facilitate rapid longitudinal movement along the rails 30, and to effect such movement I have connected a quick-acting long stroke hydraulic or pneumatic actuating device 33 to the left hand end of the carriage 31. The cylinder part of actuator 33 is rigidly secured to or in fixed relation to the housing 24, and the piston part is connected to a downwardly depending bracket 34 at the left hand end of the carriage 31. As will be readily observed from Figure 2a, application of fluid pressure to the actuator 33 will cause the carriage 31 to move into or out of the housing 24 in the manner desired.

Figure 2A:
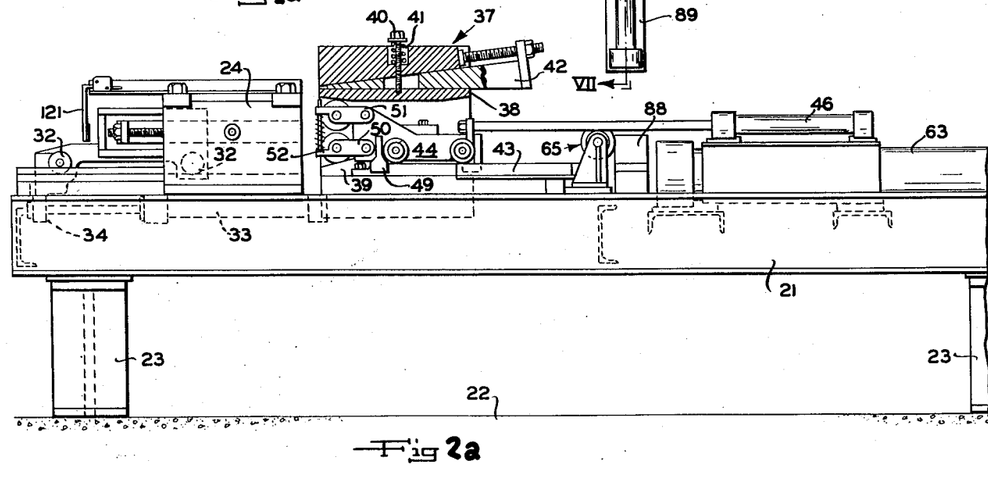
Figures 2a and 2b are complementary and continuing side elevations of the apparatus of Figures 1a and 1b.
Figure 2B:
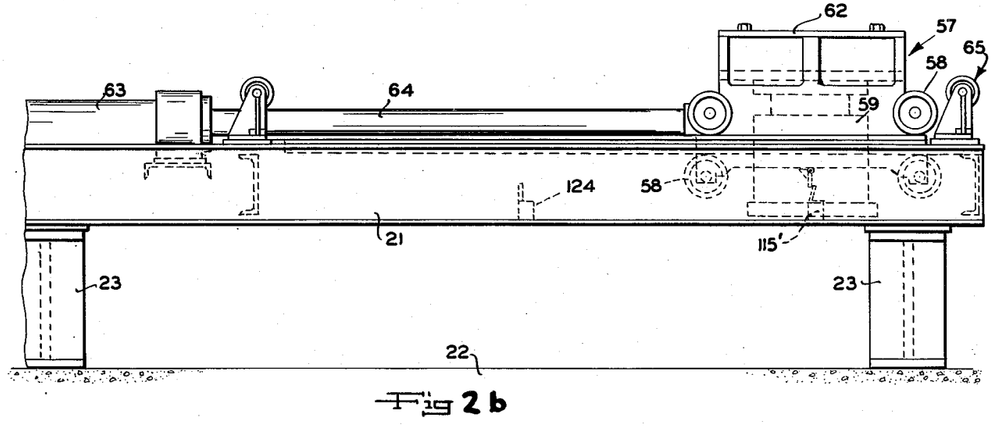

Pivotally secured to the carriage 31 at each side thereof are carrier arms 35 each of which mounts at its outer or free end a hardened roll 36. As indicated in Figures 1a and 2a the rolls 36 are mounted for rotation about a vertical axis and are adapted to have rolling contact with the exposed surfaces of cam plate 25. If desired, suitable means, not shown, may be provided to bias arms 35 outwardly of the carriage 31 whereby rolls 36 are at all times maintained in separated relation and in contact with the cam plates 25. The carriage and parts supported thereby are so oriented that when the carriage 31 is in its outermost position as indicated in Figures 1a and 2a, rolls 36 will be in contact with cam plates 25 at the tapering end portions thereof, and will accordingly be related in maximum divergence. Preferably the adjustment of plates 25 is such that rolls 36 are separated an amount slightly greater than the width or horizontal dimension of a bar or metal blank to be pointed in the apparatus. The arrangement is such that the end portion of a bar, not shown, may be readily moved through the housing 24, from right to left as viewed in Figure 1a, and positioned between rolls 36. By subsequently applying fluid pressure to the rod end of actuator 33, carriage 31 will be caused to move a short distance toward housing 24 whereupon rolls 36 become wedged between the bar, not shown, and the tapering surfaces of cams 25. By means to be hereafter described the bar may then be drawn to the right out of housing 24 whereby the frictionally engaged rolls 36 will be caused to roll along cam plates 25. The tapering surfaces of plates 25 cause the rolls 36 to move in a converging direction until the same move onto the generally flat and parallel surface portions of the plates 25. The bar, not shown, is accordingly compressed inwardly by the rolls 36 to a final dimension determined by the adjusted spacing of plates 25, and upon complete withdrawal of the bar from the housing 24 the end portion of the bar will be reduced evenly to a predetermined width dimension.

Generally a bar or other metal blank, prior to being drawn through a die, must be pointed or reduced in thickness as well as in width, and I therefore provide a second roll pass positioned behind or to the right of the housing 24. By this arrangement withdrawal movement of the bar from housing 24 may be continued to cause the end portion to be pointed to also pass through the second roll pass. Where, as is contemplated in the present illustration, the stock to be pointed is rectangular in cross section, the second roll pass may be disposed at right angles to the first to complete the reduction of the bar.

In the illustrated apparatus the second roll pass comprises a strong and rigidly constructed housing 37 which is mounted on I-beams 20 and 21 longitudinally adjacent housing 24. Cam plates 38 and 39 which, as plates 25, diminish in thickness at each end are secured to the upper and lower walls respectively of the housing 37. Preferably, however, only the upper plate 38 is adjustable, while the lower plate 39 is rigidly secured to the housing 37. Bolt 40, spring 41 and wedge-shaped gib 42 provide for adjusting movement of the upper plate 38 in a manner previously described in relation to cam plates 25.

Rigidly secured to the lower wall of housing 37 in straddling relation to lower cam plate 39 are spaced rail members 43 which carry a second roll carriage 44. Carriage 44 is provided with a plurality of anti-friction wheels 45 to facilitate longitudinal movement into and out of the housing 37 as is desired in carrying out my invention. A quick-acting hydraulic or pneumatic actuator 46 or other suitable means may be utilized for effecting longitudinal movement of the carriage 44 when desired.

For guiding the carriage 44 I have provided a rail member 47 which is positioned intermediate rails 43 and is adapted to cooperate with a U-shaped bracket 48 secured to the carriage 44 to guide the right hand end thereof. The left hand end of the carriage may be guided by means of brackets 49 which are secured to the carriage 44 at each side thereof and are adapted to bear against the side surfaces of rail members 43.

Pivotally mounted in vertically spaced relation at each side of the carriage 44 by means of rods 50 are pairs of upper and lower carrier arms 51 and 52 respectively which carry upper and lower hardened rolls 53 and 54. The rolls 53 and 54 are, of course, horizontally disposed and adapted to have rolling contact with upper and lower cam plates 38 and 39. Springs 55, carried by rods 56 and positioned between upper and lower arms 51 and 52, tend to bias the rolls 53 and 54 apart and maintain the same in contact with the track plates 38 and 39.

Rolls 53 and 54, as rolls 36, are initially positioned at the left hand end of housing 37 in contact with the tapering end portions of track plates 38 and 39; the adjustment of upper plate 38 being such that rolls 53 and 54 are initially spaced slightly greater than the thickness of the bar to be reduced. Thus, after the end portion of a bar has passed through the housing 24 after having been reduced in a horizontal transverse direction, fluid pressure may be applied to the rod end of actuator 46 to cause rolls 53 and 54 to be wedged between the bar and track plates 38 and 39. Reduction of the bar in a vertical transverse direction is then effected by subsequent movement of the rolls 53 and 54 along the full length of the track plates 38 and 39 in the manner similar to that set forth in my previous patents referred to above.

As will be understood, the continued movement of rolls 53 and 54 along the length of cam plates 38 and 39 is effected primarily by frictional engagement of the rolls between the bar, not shown, and the cam plates, whereby upon the bar being drawn to the left rolls 53 and 54 will roll along the surface of the cam plates and the bar and will reduce the latter to a predetermined uniform thickness according to the adjusted setting of gib 42. Actuator 46, as actuator 33, serves in the reducing operation merely to initially establish frictional engagement of the rolls with the bar and cam plates, and although fluid pressure may be continuously applied to the actuators 33 and 46 tending to urge carriages 31 and 44 to the right such urging is preferably ineffective to cause reducing or pointing of the bar.

In the illustrated apparatus it is contemplated that elongated metal bars will be fed into operation position along a longitudinal pass line through housings 37 and 24. According to the teachings of the invention the bars, not shown, are initially positioned at the right of housings 24 and 37 in alignment therewith, whereupon they may be gripped and moved to the left to position the end portion of the bar between vertically disposed rolls 36. Complete pointing of the bar may then be effected by withdrawing the end portion of the bar through first the housing 24 and second the housing 37 wherein the bar is reduced in horizontal transverse and vertical directions respectively in the manner previously described.

Figure 6:
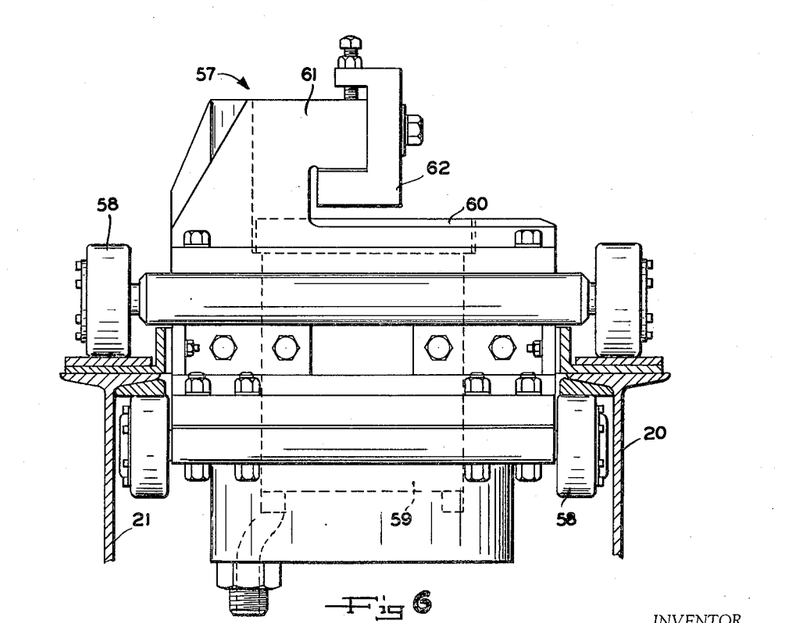
Figure 6 is a fragmentary section view taken generally along line VI—VI of Figure 1b.

For gripping the bars and causing longitudinal movement thereof into and out of housings 24 and 37 I have provided at the extreme right hand end portion of the apparatus a carriage 57 mounting a clamping device and adapted for longitudinal movement toward and away from housings 24 and 37. The carriage 57 (see Figure 6) is provided with a plurality of anti-friction wheels 58 which bear through the medium of suitable bearing plates upon the upper flanges of I-beam members 20 and 21. The carriage 57 in the present apparatus carries a large ram-type hydraulic actuator 59 having a flat upper end surface 60 and movable vertically through a short operating stroke. The upper end surface 60 of the actuator 59 is arranged to lie flush with the upper surface of the carriage 57 when the actuator is in a deenergized condition whereby a bar may be readily moved across the surface of the carriage to a position overlying the actuator 59. This is in accordance with a preferred method of and arrangement for loading and unloading elongated bars into the apparatus as will subsequently be described.

Rigidly secured to the carriage 57 at one side only thereof is an L-shaped bracket 61 the upper horizontally extending leg of which overlies the actuator 59 in spaced relation to the upper surface 60 thereof. In the preferred construction the L-shaped bracket 61 is spaced a substantial distance above the actuator 59 and is adapted to carry a rigid abutment member 62 in closely spaced relation to the actuator 59. Preferably the normal separation between the lower surface of abutment 62 and the upper surface 60 of actuator 59 is only slightly greater than the initial thickness of a bar, not shown, to be pointed. Thus upon a bar being positioned over the actuator 59 and fluid pressure being applied to the latter the bar may be tightly clamped with minimum movement of the large-diameter actuator. Where bars of greater thickness are to be pointed in the apparatus a different abutment member, not shown, may be substituted for abutment 62 whereby the required clamping movement of the actuator 59 may be maintained at a practical minimum.

Longitudinal movement of the carriage 57 in drawing a bar through the reducing roll passes requires force of a relatively high magnitude, and accordingly I have provided a large diameter long stroke hydraulic actuator 63 which is carried by I-beam members 20 and 21 with the piston member 64 thereof rigidly connecting the carriage 57. The actuator 63 is preferably arranged so that fluid is applied to the head end thereof during movement of the carriage 57 outwardly of the housings 24 and 37 and to the rod end during inward movement. Thus, I may utilize a large diameter piston rod 64 to achieve strength and rigidity and to provide for rapid inward movement of the carriage 57. There being no appreciable resisting force upon the carriage 57 during inward movement thereof to insert a bar into housings 24 and 37, a small effective area of the rod end of actuator 63 is a definite asset in that a large movement of the carriage 57 results from a relatively low volume of fluid displacement within the actuator. The effective area for the return or outward stroke of piston 64 is of course the full area of the actuator and accordingly a large force is available during a pointing operation.

Figure 5:
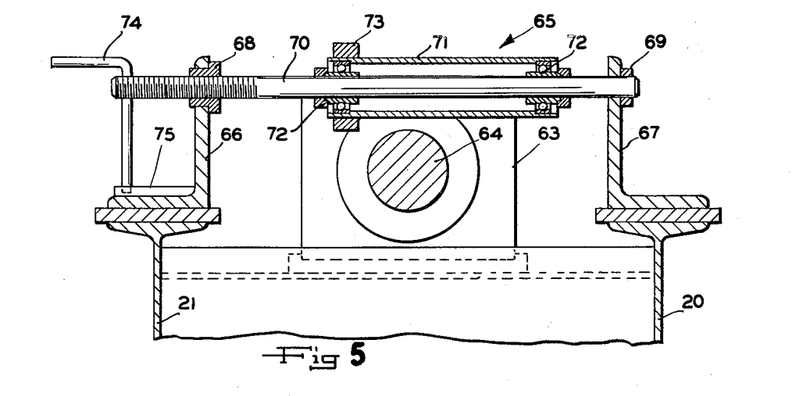
Figure 5 is a fragmentary section view of my apparatus taken along line V—V of Figure 1b.

To support an elongated bar intermediate the carriage 57 and the housings 24 and 37, and if necessary outwardly of the carriage, I have provided a plurality of horizontally disposed transverse supporting roller assemblies 65, a typical one of which is illustrated in detail in Figure 5. Each roll assembly comprises a pair of spaced upstanding L-shaped brackets 66 and 67 which are rigidly mounted to the upper flange of I-beam members 20 and 21. Carried by brackets 66 and 67 respectively are threaded collar 68 and bearing 69 which are adapted to receive a shaft 70. As viewed in Figure 5 the left hand end portion of shaft 70 is threaded to engage the collar 68 while the right hand end portion of the shaft is slidably received in the bearing 69. Intermediate brackets 66 and 67 the shaft 70 supports a roller 71 by means of anti-friction bearings 72. And in the preferred construction bearings 72 are secured to the shaft 70 to prevent axial movement of roller 71 with respect thereto.

According to features of my invention to be hereafter more fully described elongated bars to be pointed will be fed laterally onto the rollers 71 and into clamping relation to the carriage 57. Thus, to assist in properly positioning a bar for longitudinal insertion into housings 24 and 37 I have provided a collar 73 which is rigidly secured to the left hand end of roller 71 and which provides an abutment stop for bars moving laterally onto the roller 71 from right to left. To properly accommodate bars of various widths the abutment stop must be shifted toward and away from the principal longitudinal axis or pass line of the apparatus, and accordingly I provide means for rotating the shaft 70 whereby, by means of the threaded engagement with collar 68 the roller 71 and collar 73 carried thereby may be shifted to the left or right as may be desired.

A simple and practical arrangement for such adjustment is afforded by a crank 74 the radius arm of which is slidably received in the shaft 70. The arrangement is such that when the crank 74 is vertically disposed with the handle portion thereof up the radius arm may extend substantially to the I-beam member 21. The lower end portion of the radius arm may thus be held in a channel formed by a pair of spaced blocks 75 to prevent accidental rotation of the shaft 70. For adjustment, the crank may be raised upwardly and rotated as desired, subsequent to which it is returned to the locked position shown in Figure 5 by merely aligning the crank 74 vertically and sliding it downwardly.

Figures 3, 4:
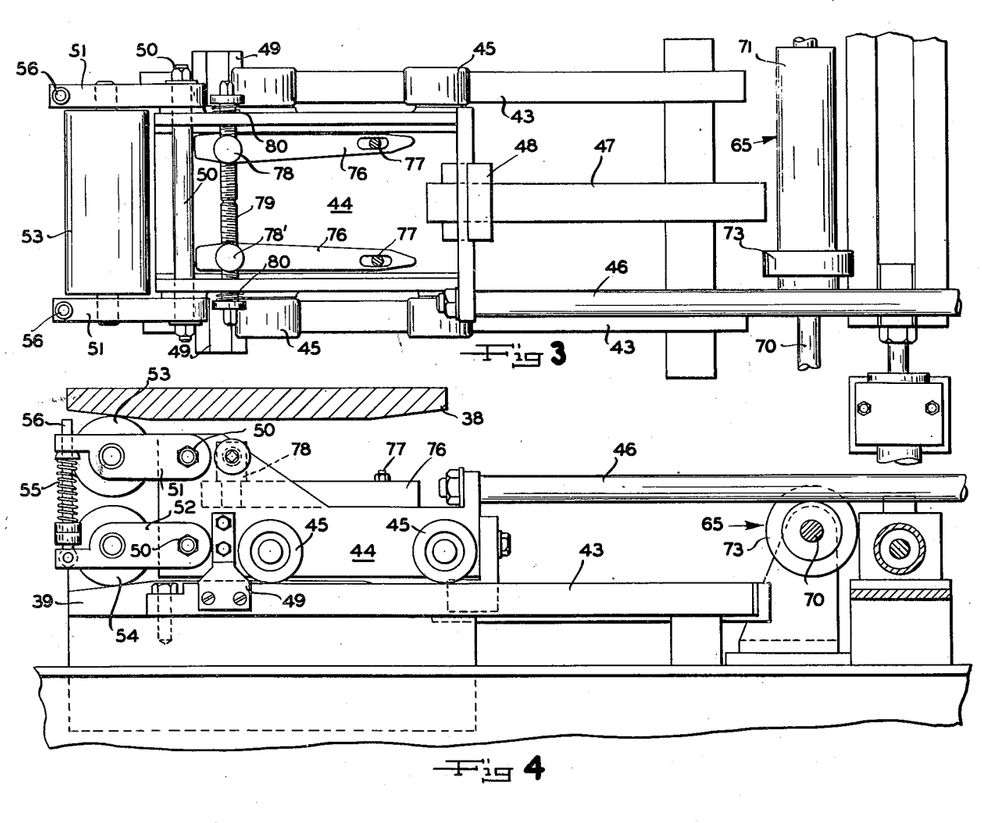
Figure 3 is an enlarged fragmentary plan view of the apparatus of Figure 1a showing details of a roll pass utilized in my apparatus for reducing a metal bar.
Figure 4 is a side elevation of the apparatus shown in Figure 3.

To further assist in properly aligning a bar prior to reducing the end portion thereof I have provided means carried by the second roll carriage 44 for guiding the forward end of the bar as the same is inserted into the housing 37. As illustrated in Figures 3 and 4 the roll carriage 44 carries at each side of the pass line of the stock a guide bar 76 which is adapted for limited pivotal and longitudinal sliding movement with respect to a stud 77 projecting upwardly from the upper surface of the carriage. Extending upwardly from the left hand end of each guide bar 76 is a pin 78 or 78' which is rotatable with respect to the guide bar 76 and is provided with a horizontal threaded bore therethrough for the reception of a threaded shaft 79. Shaft 79 is provided with threads of opposite lead extending outwardly of the center portion thereof, and pins 78 and 78' are threaded accordingly whereby upon rotation of the shaft 79 the pins 78 and 78' and guide bars 76 will move toward or away from each other.

Since slight misalignment of a bar is not too objectionable I have provided that the guide bars 76 may shift resiliently to one side or the other of the pass line. This is accomplished by positioning coil springs 80 about each end of the shaft 79 which act upon the side wall of carriage 44 and upon flanges provided at each end of the shaft. This arrangement, as will be observed, provides that the guide bars will be normally disposed in accurate alignment and in symmetrical relation to the stock pass line, but that stock which is misaligned within certain tolerable limits may be accommodated by the apparatus.

Figure 8:
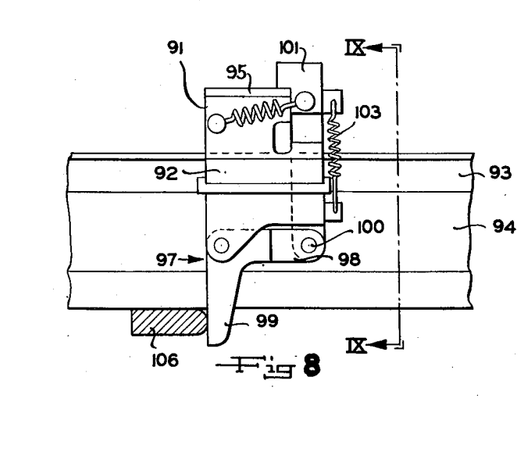
Figure 8 is an enlarged fragmentary view of the apparatus of Figure 7.
Figure 9:
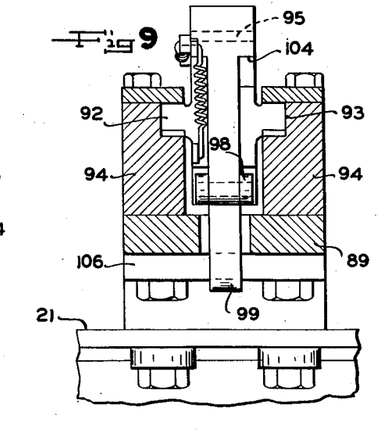
Figure 9 is a section view taken along line IX—IX of Figure 8.
Figure 10:
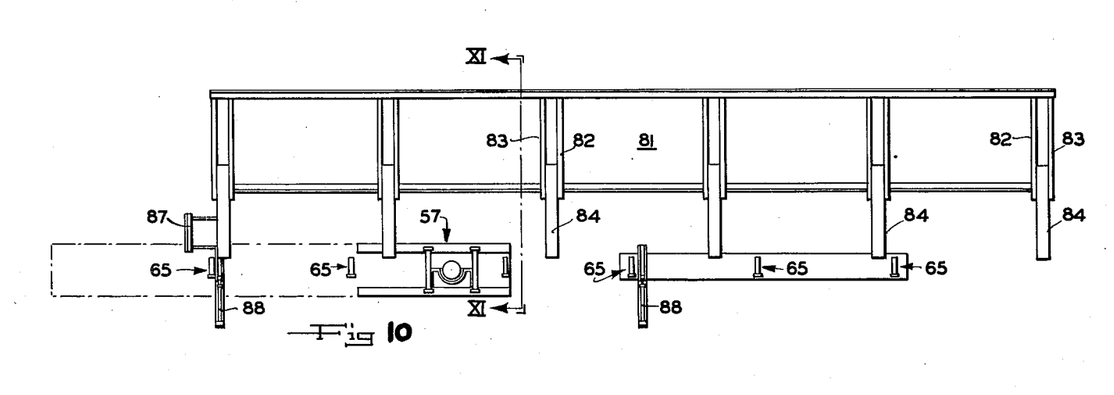
Figure 10 is a plan view of apparatus which may be expediently utilized along with my bar point machine for loading elongated blanks thereinto.
Figure 11:
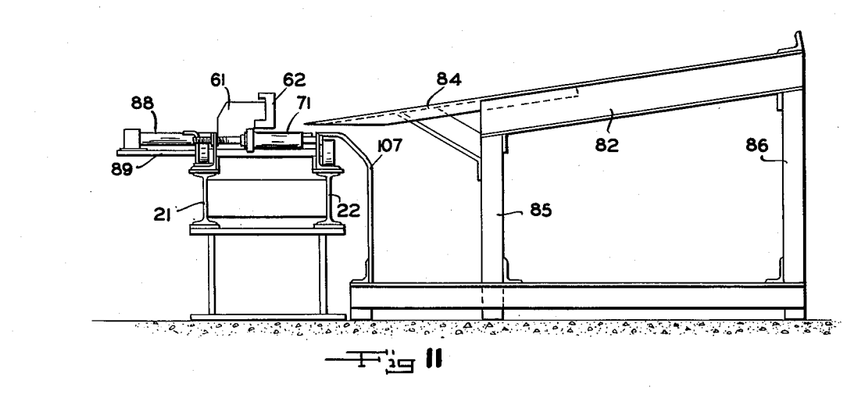
Figure 11 is an enlarged section view of the apparatus of Figure 10, taken along line XI—XI thereof.

Apparatus for loading elongated bar stock into my pointing machine is illustrated in Figures 7–11. Referring initially to Figures 10 and 11, I have provided a loading dock 81 which is of sufficient length to accommodate bar stock of the largest contemplated lengths. The loading dock 81, the general arrangement of which is shown in Figure 10, is positioned laterally adjacent the pointing apparatus and extends rearwardly from a point longitudinally adjacent the second housing 37. Suitable structural members 82 and 83, supported by legs 84 and 85, form a supporting platform for unprocessed bar stock, which supporting platform preferably slants downwardly towards the pass line of the pointing apparatus terminating slightly above and over or immediately adjacent rollers 71. It is contemplated in connection with the loading apparatus that suitable means, not shown, will be employed to feed bars one at a time from the supporting platform onto the rollers 71. Such means are well known in this art and may be of the walking beam type, for example. It is also contemplated that the bar stock will be positioned on the loading platform in such manner that the leading ends of the bars will be properly positioned with respect to the pointing apparatus, and for this purpose I may employ any of various well known means, not shown, to cause the leading ends to be moved into contact with a positioning stop 87 carried by the loading dock 81 and positioned adjacent the housing 37.

Figure 7:
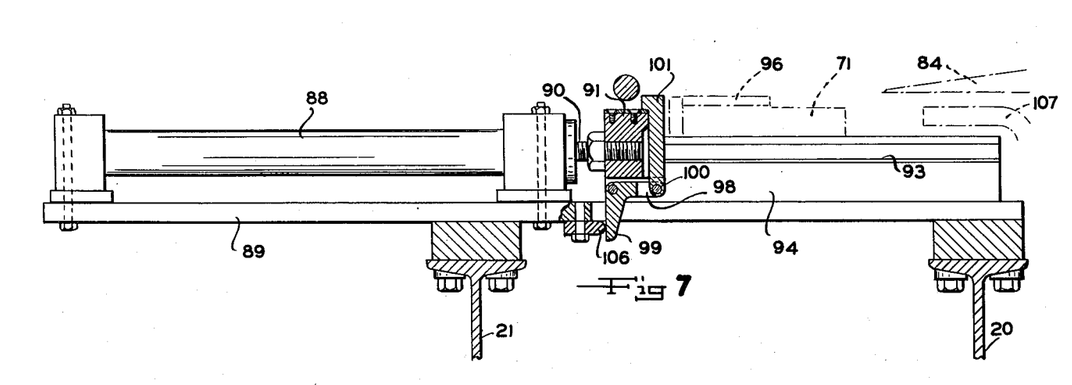

After a bar has been fed from the loading dock 81 onto the rollers 71 it must be drawn into engagement with the abutment collars 73, and for this purpose I have devised a novel apparatus as shown in Figures 7–9. The illustrated apparatus comprises a long stroke hydraulic or pneumatic actuating device 88 which is mounted on I-beam members 20 and 21 by means of a substantially rigid plate 89. The actuating device 88 is disposed horizontally and transversely to the pass line of the apparatus, and is located substantially to one side of the pass line, preferably on the side thereof opposite the loading dock 81. The piston member of actuator 88 is adapted for movement from a fully retracted position as shown in Figure 7 to a point wherein the outer end of the piston rod 90 underlies the supporting platform. As further illustrated in Figure 7 the axis of piston rod 90 is positioned a predetermined distance below the lower surface of a bar 96 supported on the rollers 71.

Rigidly mounted on the outer end of piston rod 90 is a slide block 91 having oppositely disposed laterally extending guiding keys 92 thereon adapted for guided sliding movement in complementary ways 93 provided in spaced guide rails 94. The rails 94 are secured to the plate 89 in parallel relation to the axis of movement of piston rod 90 and serve to rigidly guide the movement of the block 91 along each axis. According to the teachings of the invention the upper surface of block 91, preferably a hardened plate 95, lies just slightly below the lower surface of a bar 96 supported by the rollers 71.

Pivotally secured to the lower end of the sliding block 91 is a bell crank member 97 the upper leg 98 of which is normally horizontally disposed and extends to the forward end of block 91, and the lower leg 99 of which is normally vertically disposed and extends below the lower edge of guide rails 94. The end portion of upper leg 98 is bifurcated and is provided with a pin 100 for pivotally mounting a retractible latch member 101. The latch member 101 extends upwardly from the bell crank 97 and is provided with an enlarged shouldered head portion adapted to engage the upper surface of block 91 in the manner shown in Figure 8. To normally retain the latch 101 in the position shown I have provided an extensible coil spring 102 which connects the latch 101 with the body of the block 91 to yieldably urge the latch toward the block. A second spring 103 is also provided to urge the latch downwardly to normally maintain the shouldered head portion of the latch in contact with the upper surface of the block 91. Both springs 102 and 103 should be of substantial strength to properly function in the manner desired.

Prior to an unprocessed bar being moved from the loading dock 81 onto the rollers 71 piston rod 90 is fully extended so that at least the latch 101 underlies the member 84 of the supporting platform. After a bar has been pushed or otherwise caused to drop from the member 84 onto the rollers 71 fluid pressure is applied to the rod end of actuator 88 and the sliding block 91 is moved to the left whereby the head portion of latch 101 engages the edge of the bar and moves the same to the left toward the abutment collars 73 mounted on rollers 71. The bar will engage collars 73 when approximately in the position illustrated by the bar 96 of Figure 7 whereupon further movement of the bar to the left is prevented. Thus, upon continued movement of block 91 to the left the latch member 101 will be caused to pivot outwardly of block 91 against the restraining action of spring 102. When the latch 101 moves outwardly far enough for the head portion thereof to clear the upper corner of the block spring 103 causes the latch to snap downwardly to a position wherein the top of the latch is approximately aligned with the top surface of block 91. Engaging shoulders 104 and 105 on the latch and block respectively serve to limit the downward movement of the latch as will be readily observed. And with the latch in such position bell crank member 97 will be pivoted so that the lower leg 99 thereof is directed to the left of the block 91.

To subsequently reset the latch 101 to its normal position I have provided a stop bar 106 which is secured in transverse relation to plate 89 and which is positioned so as to engage the lower leg 99 of crank 97 before the block 91 reaches its retracted limit position as shown in Figure 7. Upon the leg 99 engaging stop bar 106 the former is caused to pivot into its normal position. And it will be noted that latch 101 will be carried upwardly against the action of spring 103 until the head portion thereof clears the upper surface of the block. Spring 102 then draws the latch inwardly to its normal position as indicated in Figure 8.

Upon the completion of a pointing operation in the apparatus a finished bar may be removed from the machine by applying fluid pressure to the head end of actuator 88 whereby block 91 is caused to move to the right. Latch 101 again engages bar 96 causing it to move to the right onto a platform 107 located beneath the supporting platform member 84. When the block 91 is fully extended to the right a finished bar will be completely discharged from the machine and the block 91 will be properly positioned beneath platform member 84 to receive an unprocessed bar for positioning and pointing.

The number of bar positioning devices of the type described above which should be used to properly align a bar for pointing is optional in most cases. I have found two to be sufficient for most purposes if the same are positioned in the manner shown in Figure 10, i. e., at widely separated points, preferably one on each side of the clamp carriage 57.

Figure 12:
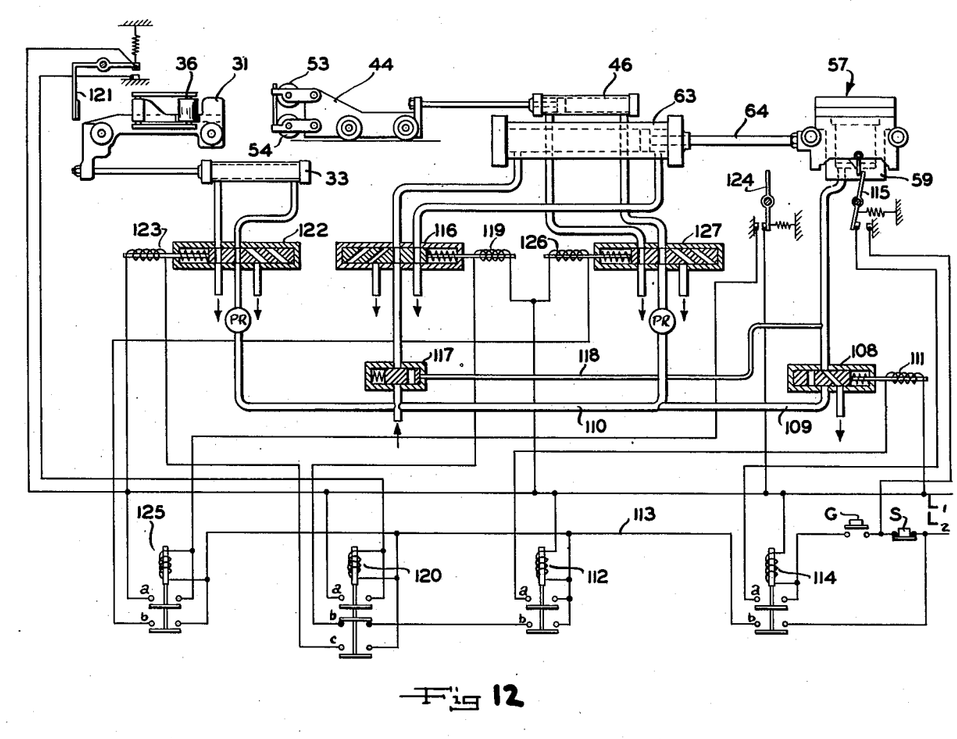
Figure 12 is a schematic representation of control apparatus which may be used with the apparatus of Figures 1a and 1b.

A simplified control arrangement for my pointing apparatus is illustrated schematically in Figure 12, and it will be observed therein that the bar-clamping actuator 59 is connected with a source of fluid pressure, not shown, through a three-way solenoid valve 108. Valve 108, when deenergized, connects actuator 59 to exhaust, and when energized connects it with the fluid source, not shown, through conduits 109 and 110. The operating coil 111 for valve 108 is connected directly to one terminal L1 of an electric power source and is connected to the other terminal L2 through normally open contacts 112a of a control relay 112, terminal conductor 113 and normally open contacts 114b of a control relay 114. Relay 112 is connected between terminal L1 and terminal conductor 113 and is accordingly energized upon closing of contacts 114b. Relay 114 is connected to terminal L1 and to terminal L2 through start button G and stop button S. A holding circuit for relay 114, in parallel with start button G, is provided through normally open contacts 114a and normally closed limit switch 115, the latter of which is operated by the clamp carriage 57 and is open when the carriage 57 is positioned to receive an unprocessed bar. Thus, upon a bar being moved into clamping position on the carriage 57, start button G is pushed and held closed to energize relays 114 and 112 and valve 108, and fluid pressure is thereby directed to the actuator 59 to cause the bar to be firmly clamped to the carriage 57.

Drive actuator 63 for carriage 57 is connected with the fluid source, not shown, through a four-way solenoid operated valve 116 and a pilot operated pressure responsive valve 117, the latter of which communicates with actuator 59 through pilot conduit 118. Valve 117 is arranged to open in response to a predetermined pressure rise in actuator 59 signifying the application thereby of adequate clamping pressure to a bar for carrying out a pointing operation.

Operating coil 119 for valve 116 is connected to terminal L1 and to terminal conductor 113 through normally closed contacts 120b of control relay 120 and through normally open contacts 112b. The operating coil for relay 120 is connected to terminal conductor 113 and to terminal L1 through a normally open target type limit switch 121. Accordingly, relay 120 will remain in a deenergized condition until limit switch 121 is tripped, and this is accomplished by feeding of a bar into position for pointing as will subsequently appear. Valve 116, therefore, will be initially energized by closing start button G.

Valve 116, when energized, is conditioned to direct fluid pressure to the rod end of actuator 63 to cause carriage 57 to move toward the left to feed a bar clamped therein into position for pointing. To insure that the carriage 57 does not begin to move before a bar is properly clamped therein, pressure responsive valve 117 blocks passage of fluid to actuator 63 until a predetermined clamping pressure exists in actuator 59. When valve 117 opens, carriage 57 immediately begins to move to the left, and it will be noted that limit switch 115 closes to complete the holding circuit for relay 114. Start button G may then be released.

Carriage 57 continues to move to the left until the end of the bar carried thereby trips target switch 121 to energize relay 120. At this instant normally closed contacts 120b open to deenergize valve 116 and normally open contacts 120c close to energize the operating coil 123 of a four-way valve 122.

Valve 122, when energized, directs fluid pressure to the rod end of roll carriage actuator 33, and in the manner previously described causes rolls 36 to engage a bar positioned therebetween. Simultaneously, by reason of valve 116 being deenergized, actuator 63 is reversed causing carriage 57 to move to the right to draw the bar carried thereby through rolls 36.

After a predetermined movement of carriage 57 to the right the same engages and trips a limit switch 124 causing a control relay 125 to be energized. Closing of normally open contacts 125b energizes operating coil 126 of four-way valve 127 and causes fluid pressure to be directed to the rod end of roll carriage actuator 46. Rolls 53 and 54 are thereby drawn into engagement with the bar stock and upon continued movement to the right of carriage 57 the pointing operation is completed as previously described.

When the carriage 57 reaches its initial position as shown in Figure 12, limit switch 115 is again opened and relay 114 is deenergized. Upon contacts 114a and 114b opening, relays 112, 120 and 125, and all valves are deenergized. Accordingly, the stock clamping actuator 59 is released and roll carriage actuators 33 and 46 are conditioned to return carriages 31 and 44 to their initial forward positions. The apparatus is then ready to receive a new stock piece for a subsequent pointing operation.

It will be understood that the control arrangement as described may be integrated, if desired, with the loading apparatus in such manner as to render the entire operation fully automatic. It is contemplated that such control integration will be within the purview of one skilled in the art.

The various advantages of my invention should now be apparent. My apparatus embodies various novel features of construction and operation whereby rates of production may be substantially increased while maintenance and attention required by an operator are substantially reduced.

By the various teachings of my invention bar pointing operations may be rendered fully automatic, from the time blanks are placed on the loading dock to the time the same are discharged from the pointing machine. The entire operation is carried out in a most expeditious manner whereby both the quantity and quality of the finished product are materially improved.

The apparatus required in carrying out the invention is of a relatively simple nature and therefore construction and maintenance costs are low. In addition, adjustments may be readily made while the machine is idle or in operation, and such adjustments are of an extremely simple nature, as for example adjusting the position of one of the wedge-shaped gibs 28 or 42, or adjusting the position of the various control limit switches. Where stock of various shapes and sizes is to be processed in my apparatus, a minimum of down time is required to reset the entire apparatus to accommodate a new size and/or shape. As will also be readily apparent, no special tools or skill are required to make minor adjustments or to reset the entire apparatus for new stock.

Reducing the cross section of a metal bar solely by rolling contact therewith of a hardened roll is inherently efficient and subject to a minimum of wear, and the effective use of such an arrangement for reducing the end portions of bar stock and the like is rendered possible and practical through the teachings of my present and prior related inventions. Particularly, my novel arrangement for reducing the end portion of a bar along angularly displaced transverse axes in related sequence is especially adaptable for stock of angular cross section. Whereas heretofore a substantial portion of the pointed end of a stock piece was reduced to scrap during the pointing operation, my apparatus and mode of operation reduces such scrap to an absolute minimum and a proportionate saving is realized.

By suitable contouring and positioning the stock-engaging rolls of the apparatus above described, and by adding guides where necessary, it is possible to adapt the general apparatus herein described for the pointing of various stock shapes. For example, I contemplate that the invention herein described may be readily adapted to the pointing of tubes and for this purpose the cylindrical work-engaging rolls, such as the rolls 36 of the specific embodiment illustrated, would be replaced with hourglass type of rolls which are operative to confine the tubular sections of the tube blank for a substantial portion of its circumferential extent to thereby reduce the girth of the tube blank rather than simply changing its peripheral shape.

It should be understood however that the particular embodiment illustrated herein is intended to be exemplary only, and reference should therefore be had to the appended claims in determining the true scope of the invention.

Having thus described my invention what I claim as new and desire to secure by Letters Patent is:

1. Apparatus for pointing bars and the like comprising an elongated support; a first carriage slidably mounted on said support; a first pair of spaced opposed reducing rolls loosely carried on said first carriage for engaging the side surfaces of a bar to be pointed; first opposed cams mounted adjacent said rolls for moving said rolls toward each other during movement of said first carriage in one longitudinal direction; a second carriage, a second pair of reducing rolls, and second opposed cams similar to said first carriage, rolls and cams but adapted to engage the top and bottom surfaces of a bar to be pointed; said second carriage, rolls and cams being spaced longitudinally with respect to said first; means to draw the end portion of a bar to be pointed between said first and second rolls; and means operative to move said first and second carriages in said one longitudinal direction in predetermined sequence.

2. Apparatus according to claim 1 further characterized by said means operative to move said first and second carriages comprising first and second actuating members associated with said first and second carriages respectively and operative when energized to cause initial movement of said carriages to bring said rolls into engagement with said bar to be pointed, means responsive to a first position of the end portion of said bar to be pointed to energize said first actuator, and means responsive to a second position of said end portion to energize said second actuator.

3. Apparatus according to claim 1 further characterized by means to adjust said cams toward or away from each other.

4. Apparatus according to claim 1 further characterized by said means to draw the end portion of said bar comprising a clamp for holding a bar to be pointed, a first fluid actuator for operating said clamp, a second fluid actuator energizable for moving said clamp longitudinally of said support, and pressure responsive fluid control means associated with said second actuator and communicating with said first actuator operative in response to application of a predetermined fluid pressure to said first actuator to condition said second actuator for energization.

5. Apparatus for pointing bars and the like comprising a support, a carriage slidably mounted on said support and loosely mounting a pair of opposed reducing rolls for engaging the side surfaces of a bar to be pointed, opposed cams rigidly mounted on said support and engaged by said rolls to move said rolls toward each other during movement of said carriage in a first longitudinal direction, a draw carriage slidably mounted on said support, clamping means carried by said draw carriage for rigidly holding a bar to be pointed, means to move said draw carriage longitudinally toward and away from said first mentioned carriage, low power actuating means connecting said first mentioned carriage adapted when energized to move the same in said first longitudinal direction, control means operative automatically upon movement of a bar into operative relation with respect to said rolls to energize said low power actuating means, and additional control means operative simultaneously with energization of said low power actuating means to cause said draw carriage to be moved away from said first mentioned carriage in said first longitudinal direction.

6. Apparatus for pointing bars and the like comprising a support, a first rigid housing carried by said support, a first carriage carried by said support and movable longitudinally in said housing, a first cooperating pair of spaced reducing rolls carried by said carriage and adapted to engage the side surfaces of a bar to be pointed, first opposed cams carried by said housing and adapted to be engaged by said rolls to move said rolls toward each other during movement of said carriage in a first longitudinal direction, means to move a bar longitudinally into and out of said housing, first low power actuating means operative when energized to move said carriage in said first longitudinal direction, first control means operative in response to movement of a bar into said housing and into a predetermined relation to said rolls to energize said actuating means, and means operative when said actuating means is energized to cause said bar to be drawn longitudinally out of said first housing.

7. Apparatus according to claim 6 further including a second rigid housing spaced longitudinally from said first housing and carried by said support, a second carriage movable longitudinally in said housing, a second cooperating pair of spaced reducing rolls carried by said second carriage and adapted to engage the upper and lower surfaces of a bar to be pointed, second opposed cams carried by said second housing and adapted to be engaged by said second rolls to move said second rolls toward each other during movement of said second carriage in said first longitudinal direction, second low power actuating means operative when energized to move said second carriage in said first longitudinal direction, and second control means operative in response to a predetermined drawing movement of said bar longitudinally out of said first housing to energize said second actuating means.

8. Apparatus according to claim 6 further characterized by wedge shaped gibs interposed between said first housing and said cams, means to adjust said gibs relative to said housing, and yieldable means connecting said cams and said housing to urge said cams toward said housing.

9. Apparatus for pointing bars and the like comprising an elongated support, a first reducing station carried by said support and having a first cooperating pair of rolls adapted to have rolling engagement with the side surfaces of a bar to be pointed, a second reducing station carried by said support in longitudinal alignment with said first reducing station, said second reducing station having a second pair of cooperating rolls adapted to have rolling engagement with the top and bottom surfaces of a bar to be pointed, a draw carriage slidably carried by said support in longitudinal alignment with said reducing stations, means on said draw carriage to clamp a bar to be pointed at a point removed from the end portion thereof to be pointed, drive means for moving said draw carriage longitudinally toward and away from said reducing stations, means responsive to a bar being positioned in a predetermined relation between said first rolls to cause said draw carriage to move outwardly of said reducing stations and to cause said first rolls to progressively converge against the side surfaces of said bar, and means responsive to a predetermined movement of said bar through said first reducing station to cause said second rolls to progressively converge against the top and bottom surfaces of said bar.

10. Apparatus according to claim 9 further characterized by said means to cause said first rolls to progressively converge comprising first opposed cams positioned adjacent said first rolls for engagement with the outer periphery thereof, said first cams and first rolls being adapted to have normal rolling contact during rolling engagement of said first rolls with said bar, and second opposed cams related to said second rolls substantially as said first cams to said first rolls.

11. Apparatus for pointing bars and the like comprising an elongated support, a first reducing station carried by said support and having a first cooperating pair of rolls adapted to have rolling engagement with the side surfaces of a bar to be pointed, a second reducing station carried by said support in longitudinal alignment with said first reducing station, said second reducing station having a second pair of cooperating rolls adapted to have rolling engagement with the top and bottom surfaces of a bar to be pointed, means to draw a bar longitudinally through said reducing stations, means to initiate and continue progressive convergence of said first rolls when the end portion of a bar is being drawn therebetween, and means to cause progressive convergence of said second rolls after a predetermined movement of said bar subsequent to initiation of convergence of said first rolls.

12. In apparatus for pointing bars and the like of the type having longitudinally aligned reducing passes, means to draw a bar longitudinally through said passes, and means to load and discharge bars into and from said apparatus; the improvement in said loading and discharging apparatus which consists of a plurality of rollers for supporting a bar to be pointed along its longitudinal extent, abutment means positioned adjacent the longitudinal pass line of said apparatus and operative when a bar to be pointed is moved into contact therewith to properly align said bar for longitudinal movement through said apparatus, means for moving said bars into contact with said abutment means including a block slidable transversely with respect to said pass line, latch means carried by said block and adapted to engage one side surface of a bar supported on said rollers to move said bar toward said abutment means, said latch means being adapted to retract upon said bar contacting said abutment means, means operative upon continued movement of said block to reset said latch, said latch being adapted when reset and moved in a reverse direction to engage an opposite side surface of said bar to move said bar away from said abutment to discharge said bar from said machine, and means to move said block between limit positions at each side of said pass line.

13. Apparatus according to claim 12 further characterized by said abutment means comprising collars rigidly carried by said rollers, and means to adjust said rollers laterally of said pass line.

14. In apparatus for pointing bars and the like of the type having a longitudinally aligned reducing pass, means to draw a bar longitudinally through said pass, and means to load and discharge bars into and from said apparatus; the improvement in said loading and discharging apparatus which consists of means to support a bar in longitudinal movement through said pass, abutment means positioned adjacent the longitudinal pass line of said apparatus operative when a bar is moved into contact therewith to properly align said bar for longitudinal movement through said apparatus, means for moving said bars into contact with said abutment means including a block slidable transversely from one side to the other of said pass line, means to move said block from a first position substantially removed from one side of said pass line to a second position substantially removed from the other side of said pass line, projecting latch means carried by said block and adapted to engage one side suface of a bar positioned on said means to support to move said bar toward said abutment means when said block is moved in a first direction from said first to said second position, means on said block and connecting said latch to retract said latch upon said bar contacting said abutment means, and means operative upon continued movement of said block in said first direction to reset said latch in projecting position, said latch thereafter being adapted to engage the other side surface of said bar during movement of said block in a second direction.

15. Apparatus according to claim 14 further characterized by a bell crank pivotally mounted on the lower portion of said block and having a normally horizontal leg and a normally vertical leg, said latch means being pivotally mounted to said horizontal leg and extending upwardly therefrom and projecting beyond the upper portion of said block, said latch having a shouldered head portion adapted to engage said block when said latch is in said projecting position, first yieldable means connecting said latch and said block to urge said latch vertically into a retracted position, second yieldable means connecting said latch and said block to urge said latch pivotally toward said block, the arrangement being such that upon said latch being forcibly moved away from said block said first yieldable means will draw said latch into a retracted position, and means adjacent the path of travel of said block operative upon movement of said block substantially from said first to said second position to engage said normally vertical leg to force said latch into a projecting position.

References Cited in the file of this patent

UNITED STATES PATENTS

| | | |
|---|---|---|
| 1,471,250 | Entwisle et al. | Oct. 16, 1923 |
| 2,126,717 | Barnhart | Aug. 16, 1938 |
| 2,161,064 | Krause | June 6, 1939 |
| 2,161,065 | Krause | June 6, 1939 |